(12) United States Patent
Goodwin et al.

(10) Patent No.: US 6,622,188 B1  
(45) Date of Patent: Sep. 16, 2003

(54) I2C BUS EXPANSION APPARATUS AND METHOD THEREFOR

(75) Inventors: Joel Gerard Goodwin, Austin; Steven Paul Hartman, Round Rock; Scott Harlan Isensee; Wally Tuten, both of Georgetown, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/163,992

(22) Filed: Sep. 30, 1998

(51) Int. Cl.[7] ............................................... G06F 11/00
(52) U.S. Cl. ...................................... 710/101; 710/105
(58) Field of Search ................................ 710/101, 129, 710/128, 105, 126; 709/250, 230, 253; 370/466, 912

(56) References Cited

U.S. PATENT DOCUMENTS

| | | | |
|---|---|---|---|
| 4,554,657 A | 11/1985 | Wilson | 370/85 |
| 5,191,656 A | 3/1993 | Forde, III et al. | 395/325 |
| 5,325,491 A | 6/1994 | Fasig | 395/325 |
| 5,376,928 A * | 12/1994 | Testin | |
| 5,455,934 A | 10/1995 | Holland et al. | 395/404 |
| 5,457,785 A | 10/1995 | Kikinis et al. | 395/308 |
| 5,561,772 A | 10/1996 | Dornier et al. | 395/281 |
| 5,566,345 A | 10/1996 | Ostrowski | 395/822 |
| 5,611,053 A | 3/1997 | Wu et al. | 395/280 |
| 5,613,157 A | 3/1997 | Davidson et al. | 395/828 |
| 5,619,659 A | 4/1997 | Kikinis et al. | 395/281 |
| 5,623,610 A | 4/1997 | Knoll et al. | 395/281 |
| 5,649,125 A | 7/1997 | Tietjen et al. | 395/306 |
| 5,689,196 A * | 11/1997 | Schutte | |
| 5,694,557 A | 12/1997 | Yang | 395/309 |
| 5,740,386 A | 4/1998 | Miller et al. | 395/308 |
| 5,740,387 A | 4/1998 | Lambrecht et al. | 395/309 |
| 5,812,802 A * | 9/1998 | Bahout et al. | |
| 5,892,933 A * | 4/1999 | Voltz | |
| 5,892,982 A * | 4/1999 | Mitsuda et al. | |
| 5,930,484 A * | 7/1999 | Tran et al. | |

OTHER PUBLICATIONS

"Using the 8XC751 Microcontroller as an I[2]C Bus Master", Phillips Semiconductors Microcontrolled Products, Sep. 1989, pp. 1–18.

H.C. Lin et al., "Wait–State Insertion for Expansion System Interface", IBM Technical Disclosure Bulletin, vol. 26, No. 10A, Mar. 1984, pp. 5153–5158.

"Extended Data Bus with Direction and Enable Control Features", IBM Technical Bulletin, vol. 26 No. 10A, Mar. 1984, pp. 5147–5152.

"IBM Personal Computer Extended I/O Bus", IBM Technical Disclosure Bulletin, vol. 28 No. 11, Apr. 1986, pp. 4841–4842.

\* cited by examiner

*Primary Examiner*—Gopal C. Ray  
(74) *Attorney, Agent, or Firm*—Barry S. Newberger; Winstead Sechrest & Minick P.C.; Leslie A. Van Leeuwen

(57) ABSTRACT

An apparatus and method for expansion of an inter-IC (I[2]C) is provided. An expansion processor resides on a primary I[2]C bus. The expansion processor is coupled to a plurality of I[2]C sub-buses each of which may host a plurality of I[2]C devices. Data is transferred between the expansion processor and the plurality of I[2]C devices via the corresponding sub-bus according to an I[2]C protocol. Data transfer is in response to a request initiated by a bus master on the primary I[2]C bus. The bus master communicates with a target device residing on one of the sub-buses by addressing the expansion processor. The bus master informs the expansion processor of the target device by sending the expansion processor a number of the sub-bus on which the target device resides, and an address of the target device. A data stream bound for the target device is directed to the expansion processor which the echos it to the target device. Likewise, a data stream bound from the target device to the bus master on the primary I[2]C bus is transmitted to the expansion processor which the echos it to the bus master.

18 Claims, 6 Drawing Sheets

| FIG. 3A | FIG. 3B |

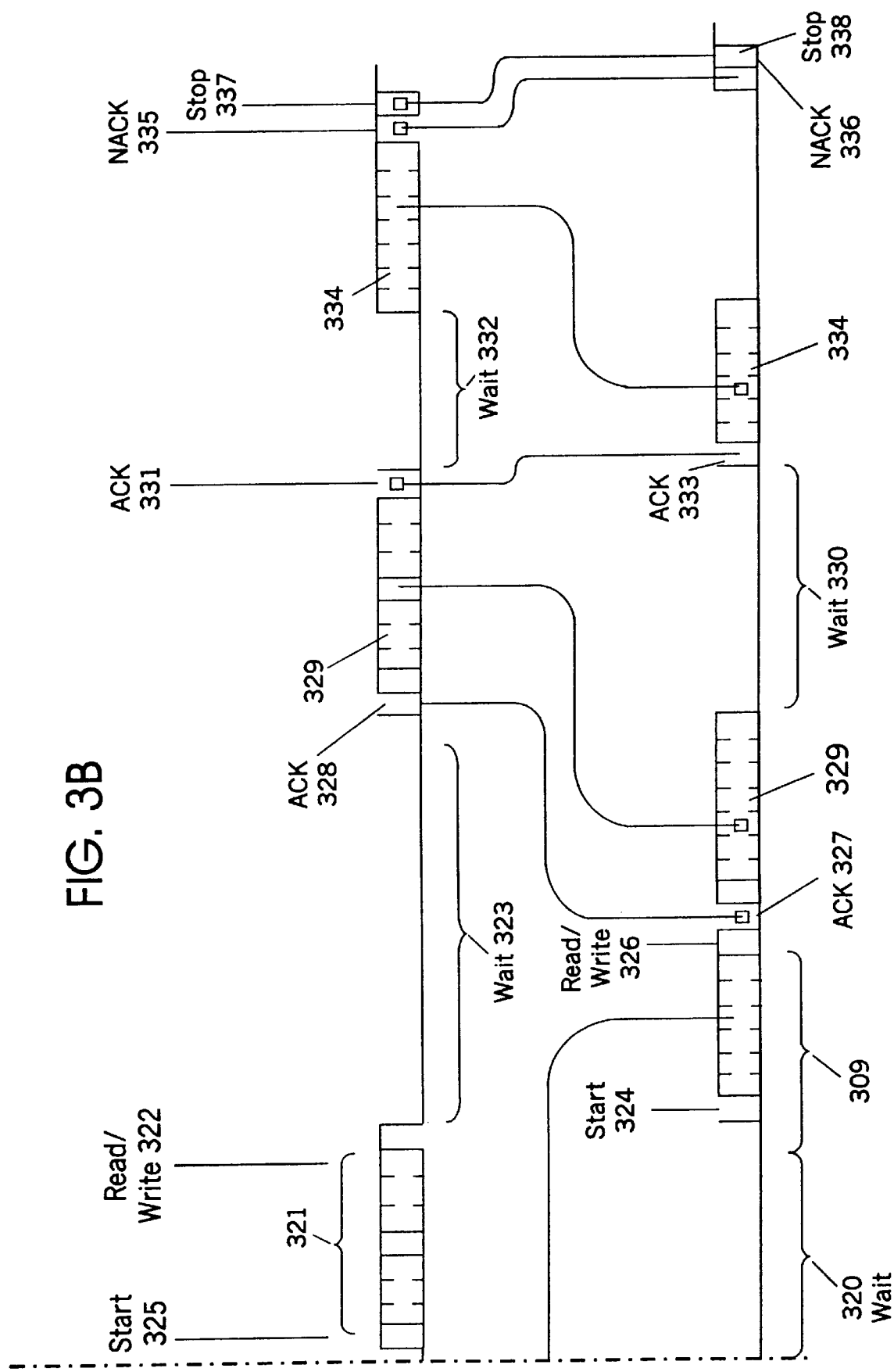

I2C BUS EXPANSION APPARATUS AND METHOD THEREFOR

TECHNICAL FIELD

The present invention relates in general to data processing systems, and in particular, to an inter-IC (I²C) bus in a data processing system.

BACKGROUND INFORMATION

The I²C bus is a 2-wire bidirectional serial bus for communication between bus devices in a data processing system. Bus devices may include microprocessors, microcontrollers, memory devices, peripheral devices, data converters, and application oriented circuits. Two wires of the I²C bus constitute a serial data line (SDA) for communicating data between bus devices, and a serial clock line (SCL) carrying clock signals that control bus access and data transfer.

Each device on the I²C bus is identified by a unique address. The least significant bit (LSB) of an address byte constitutes a read/write (R/W) bit that signals whether the current bus transaction is a read operation or a write operation. Of the remaining seven bits, four denote the functional group to which the bus device belongs, leaving three bits which may be freely assigned to form the unique address of the particular bus device. Thus, within a particular device group, or category, no more than eight devices from within the group may reside on a given I²C bus.

The limitation of eight devices from a given group on a single I²C bus significantly constrains a data processing system using an I²C bus. Thus, there is a need in the art for mechanisms and methods for expanding an I²C bus while operating within the I²C bus protocols.

SUMMARY OF THE INVENTION

The aforementioned needs are addressed by the present invention. Accordingly, there is provided in a first form, an apparatus for inter-IC (I²C) bus expansion. The apparatus includes an expansion processor operable for communicating on an I²C bus. The expansion processor is coupled to a plurality of I²C sub-buses, wherein each sub-bus of the plurality is operable for transferring data between the expansion processor and a plurality of I²C compatible devices, according to an I²C protocol, in response to signals on the I²C bus.

There is also provided, in a second form, a data processing system. The data processing system includes a central processing unit (CPU) operable for communicating on an inter-IC (I²C) bus, the CPU being operable as an I²C bus master. An expansion processor is coupled to the I²C bus, the expansion processor is also coupled to a plurality of I²C sub-buses, wherein each sub-bus of the plurality is operable for transferring data between the expansion processor and a plurality of I²C compatible devices, according to an I²C protocol, in response to signals on the I²C bus.

Additionally, there is provided, in a third form, a method for inter-IC (I²C) bus expansion. The method includes snooping a primary I²C for a preselected bus address. On receiving the preselected address, a read operation or a write operation on a sub-bus is selected in response to a data value in a portion of the address.

There is also provided, in a fourth form, a computer program product adaptable for storage on program storage media. The program product includes programming for snooping a primary I²C bus for a preselected bus address. The program product also includes programming for, on receiving the bus address, selecting a read operation or a write operation in response to a data value in a portion of the address.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
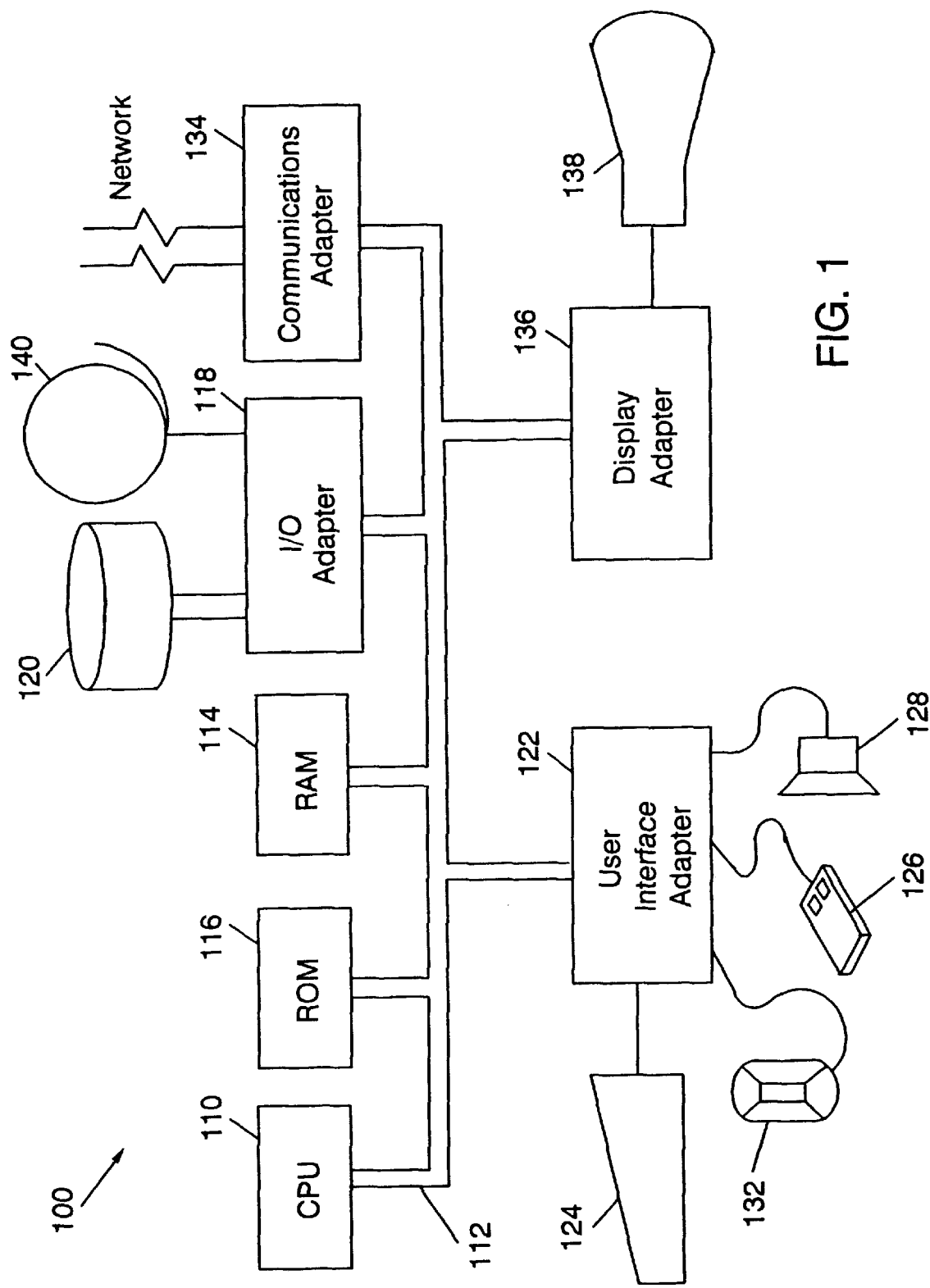
FIG. 1 illustrates, in block diagram form, a data processing system in accordance with one embodiment of the present invention.

The present invention provides an I²C bus expansion apparatus and method that permits multiple bus devices of the same group to reside on an I²C bus in a data processing system. The number of devices of a given group is not limited to the eight devices within a given group imposed by the I²C bus architecture. A data processor sitting on a primary I²C bus serves as an expansion processor servicing a plurality of sub-busses. The data processor is a slave on the primary bus and is a master of the plurality of sub-busses. A master on the primary bus issues a device select/internal pointer write sequence to the expansion processor before commencing a data transfer. A device select/internal pointer write sequence selects the address of the expansion processor on the primary I²C bus, the particular sub-bus on which the target device resides, and the address of the device on the sub-bus. After the device select sequence is issued, the master on the primary bus can execute its data transaction with the target device.

In the following description, numerous specific details are set forth such as clock intervals and data sequence lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

A representative hardware environment for practicing the present invention is depicted in FIG. 1, which illustrates a typical hardware configuration of data processing system 100 in accordance with the subject invention having central processing unit (CPU) 110, such as a conventional microprocessor, and a number of other units interconnected via system bus 112. A portion of system bus 112 may be a primary I²C bus, to be discussed in conjunction with FIG. 2. Data processing system 100 includes random access memory (RAM) 114, read only memory (ROM) 116, and input/output (I/O) adapter 118 for connecting peripheral devices such as disk units 120 and tape drives 140 to bus 112, user interface adapter 122 for connecting keyboard 124, mouse 126, and/or other user interface devices such as a touch screen device (not shown) to bus 112, communication adapter 134 for connecting data processing system 100 to a data processing network, and display adapter 136 for connecting bus 112 to display device 138. CPU 110 may include other circuitry not shown herein, which will include circuitry commonly found within a microprocessor, e.g., execution unit, bus interface unit, arithmetic logic unit, etc. CPU 110 may also reside on a single integrated circuit.

Figure 2:
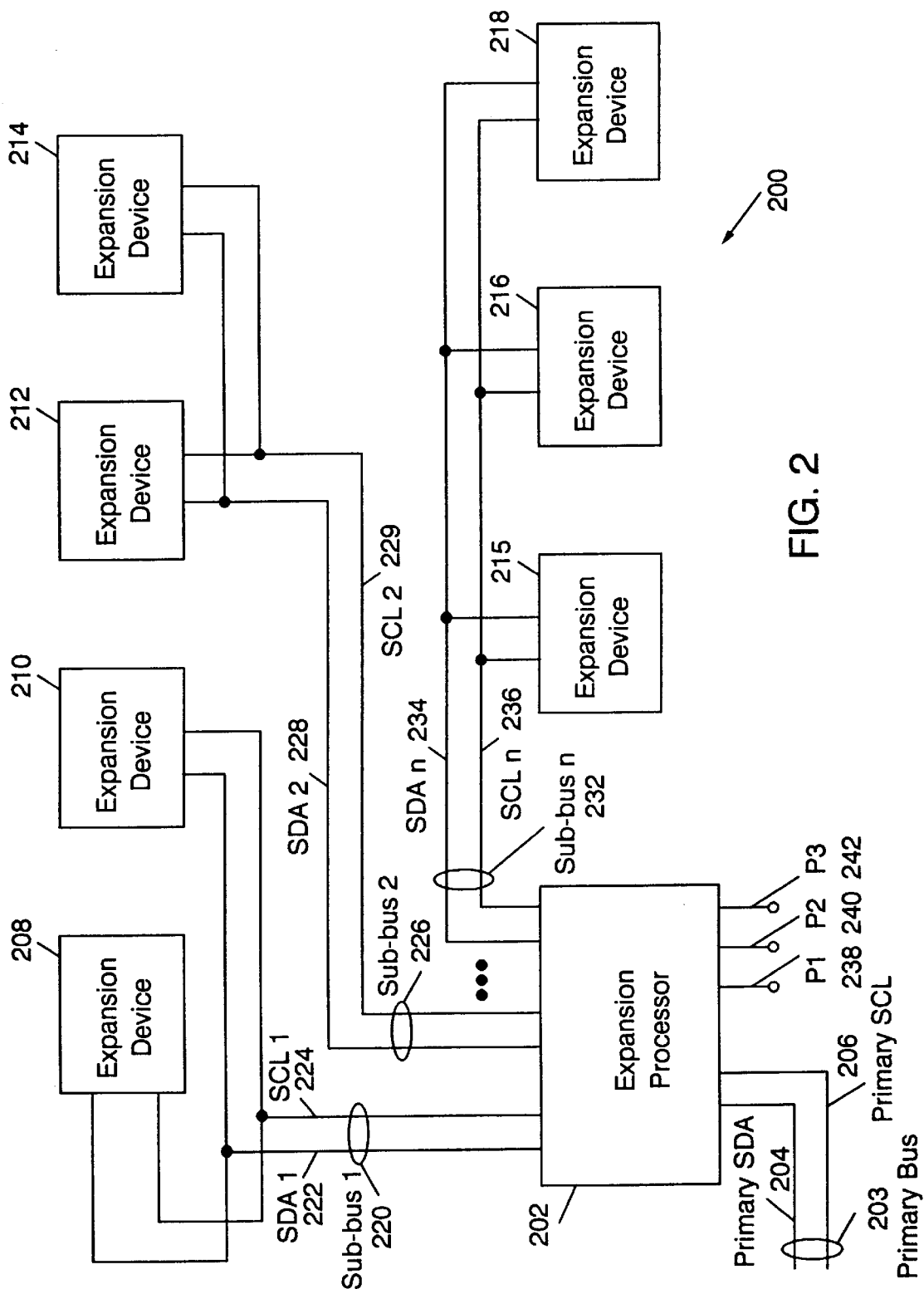
FIG. 2 illustrates, in block diagram form, an I²C bus expansion apparatus in accordance with one embodiment of the present invention.

Refer now to FIG. 2 in which is illustrated I²C expansion apparatus 200 in accordance with the principles of the present invention. Expansion processor 202 resides on primary I²C bus 203 which includes primary SDA 204 and primary SCL 206. An embodiment of expansion processor 202 may include a conventional microcontroller having I²C compatibility such as an 83C751 or, alternatively, 87C751, microcontroller manufactured by Philips Semiconductors. (These two devices differ only in the form of internal program memory.) Expansion processor 202 may be an I²C slave responding to requests from a I²C bus master residing on primary I²C bus 203. A bus master on primary bus 203 may initiate requests for an I²C transaction (either a read or a write) to a plurality of expansion devices 208, 210, 212, 214, 216, and 218. These expansion devices may include any I²C compatible device, and may include, but are not necessarily limited to, microprocessors, gate arrays, liquid crystal display (LCD) drivers, memory, data converters, and application oriented devices.

Communications between a bus master on primary bus 203 and one of the expansion devices is mediated by expansion processor 202. Each of expansion devices 208, 210, 212, 214, 216 and 218 is coupled to expansion processor 202 by one of a plurality of I²C sub-buses, sub-bus 220 through sub-bus 230. Each sub-bus includes a two-wire pair. Sub-bus 220 includes SDA 222 and SCL 224, coupling expansion devices 208 and 210 to expansion processor 202. Similarly, sub-bus 226 includes SDA 228 and SCL 229 which couples expansion devices 212 and 214 to expansion processor 202. Sub-bus 232 includes SDA 234 and SCL 236 coupling expansion processor 202 to expansion devices 215, 216 and 218. In an embodiment of the present invention in which expansion processor 202 is implemented with a conventional microcontroller, sub-buses 220, 226 and 232 may be driven from device input/output (I/O) pins. It would be understood by one of ordinary skill in the art that each of sub-buses 220, 226 and 232 may couple other numbers of expansion devices to expansion processor 202 consistent with I²C addressing specifications.

In operation, a bus master on primary bus 203 communicates with one of the expansion devices by addressing expansion processor 202. Expansion processor 202 is assigned a preselected I²C address as an I²C device on primary bus 203. In an embodiment of the present invention, the I²C address of expansion processor 202 on primary bus 203 may be assigned by programming a plurality of pins, P1 238, P2 240, and P3 242. In one embodiment of the present invention, pins 238, 240, and 242 may be dynamically programmed with a preselected address by, for example, CPU 110 in data processing system 100 of FIG. 1. Alternatively, pins 238, 240 and 242 may be statically programmed by coupling them to an appropriate voltage supply. In another embodiment of the present invention in which expansion processor 202 is a conventional microcontroller, pins 238, 240 and 242 may be a preselected set of input/output (I/O) pins wherein pins 238, 240 and 242 may be programmed with a binary address by coupling the pins to voltage supplies representing a logic "1" and a logic "0", respectively. Such static programming, would be understood by one of ordinary skill in the art. An example of address programming of pins 238, 240 and 242 is shown in Table 1.

TABLE 1

Expansion Processor Bus Addresses

| Address | P1 | P2 | P3 |
|---|---|---|---|
| 80/1 | 0 (Low) | 0 (Low) | 0 (Low) |
| 82/3 | 0 (Low) | 0 (Low) | 1 (High) |
| 84/5 | 0 (Low) | 1 (High) | 0 (Low) |
| 86/7 | 0 (Low) | 1 (High) | 1 (High) |
| 88/9 | 1 (High) | 0 (Low) | 0 (Low) |
| 8A/B | 1 (High) | 0 (Low) | 1 (High) |
| 8C/D | 1 (High) | 1 (High) | 0 (Low) |
| 8B/F | 1 (High) | 1 (High) | 1 (High) |

Address pairs indicated in the address column of Table 1 refer to I²C primary bus address pairs. Each bus device on an I²C bus corresponds to a pair of I²C addresses because the least significant bit (LSB) of a 1-byte I²C address corresponds to a read/write (R/W) bit. Thus, a pair of I²C addresses differing only in the LSB address the same I²C bus device. The value "8" is illustrative only, and may be assigned other values in alternative embodiments of the present invention.

Pins 238, 240 and 242 may be sampled by expansion processor 202 following reset and the resulting address stored internally. Note that in an embodiment of expansion processor 205 in which pins 238, 240 and 242 are bidirectional I/O pins, an expansion processor 202 having a primary bus address in which a pair of pins 238, 240 and 242 are pulled to logic "1" may also serve as one of sub-buses 220, 226 and 232. In such an embodiment, the pair of pins would be pulled to logic "1" through a corresponding pair of pull-up resistors. The use of such pull-up resistors is well within the understanding of an artisan of ordinary skill, and therefore, have been omitted from FIG. 2 for simplicity.

Each of expansion devices 208, 210, 212, 214, 215, 216, and 218 have a preselected I²C address which represents their I²C address on the devices corresponding sub-bus. After addressing expansion processor 202, the bus master in primary bus 203 sends a data value representing the sub-bus number on which the expansion device resides to expansion processor 202. The bus master then sends the I²C address of the device to expansion processor 202. In an embodiment of the present invention, the sub-bus number and the I²C address of the device on that sub-bus may be represented by a first and second data byte sent to expansion processor 202 during a primary bus 203 device selection/internal pointer write phase.

Expansion processor 202 recognizes the device selection/internal pointer write phase wherein expansion processor 202 then intermediates the transaction between the bus master and the expansion device corresponding to the sub-bus number/address sent in the device selection/internal pointer write phase. Note that the device selection/internal pointer mechanism is not part of the standard I²C protocol but is compatible with it. Expansion processor 202 stores the current bus number as the most recently used bus and the address on that bus of the addressed one of expansion devices 208, 210, 212, 214, 215, 216, and 218, as the current address. The addressed one of expansion devices 208, 210, 212, 214, 215, 26, and 218 will be referred to as the target expansion device. The remaining portion of an I²C transfer sequence from the bus master on primary bus 203 is received by expansion processor 202 and echoed to the target expansion device if the transaction between the bus master and the target expansion device is a write to the target expansion device. For a read from the target expansion device, the target expansion device sends its I²C data transfer sequence to expansion processor 202 serving as the bus master for the corresponding sub-bus. Expansion processor 202 then forwards the data to the bus master on primary bus 203 initiating the transaction with the target expansion device, expansion processor 202 then serving as a slave device on primary bus 203.

Expansion processor 202 also intermediates transfer acknowledgment processes. During a write to one of the expansion devices, expansion processor 202 will stretch the clock on primary SCL 206 until an acknowledgment/no acknowledgment (ACK/NACK) response has been received from the target expansion device. Expansion processor 202 then echoes the received response to the bus master on primary bus 203. Note that the clock stretching mechanism is standard in the I²C protocol. If expansion processor 202 receives a NACK response from the target expansion device, the NACK response echoed on primary bus 203 will be detected by the bus master and treated as an error. The bus master will then abort the entire transfer sequence and retry. Expansion processor 202 also verifies the bus number received from the bus master during the device selection/internal address phase. If the value received is not a valid bus number, expansion processor 202 responds with a NACK on primary bus 203.

Expansion processor 202 also responds to protocol errors. This condition is a "hang" on either primary bus 203 or any of sub-bus 220, 226, and 232. For each bit transfer within a byte transfer, expansion processor 202 initializes a timer, and if the bit transfer is not completed in a predetermined time interval, expansion processor 202 will abort both the transfer on primary bus 203 and on the appropriate one of sub-bus 220, 226, and 232. Expansion processor 202 releases primary SDA 204 and primary SCL 206, and will issue a start-data-stop sequence on the appropriate one of the sub-buses to clear the sub-bus. Processor 202 also prepares to receive a start condition. The start condition, stop condition, and start-data-stop sequences are standard states in the I²C protocol and will be described further in conjunction with FIG. 3.

Figures 3, 3A:
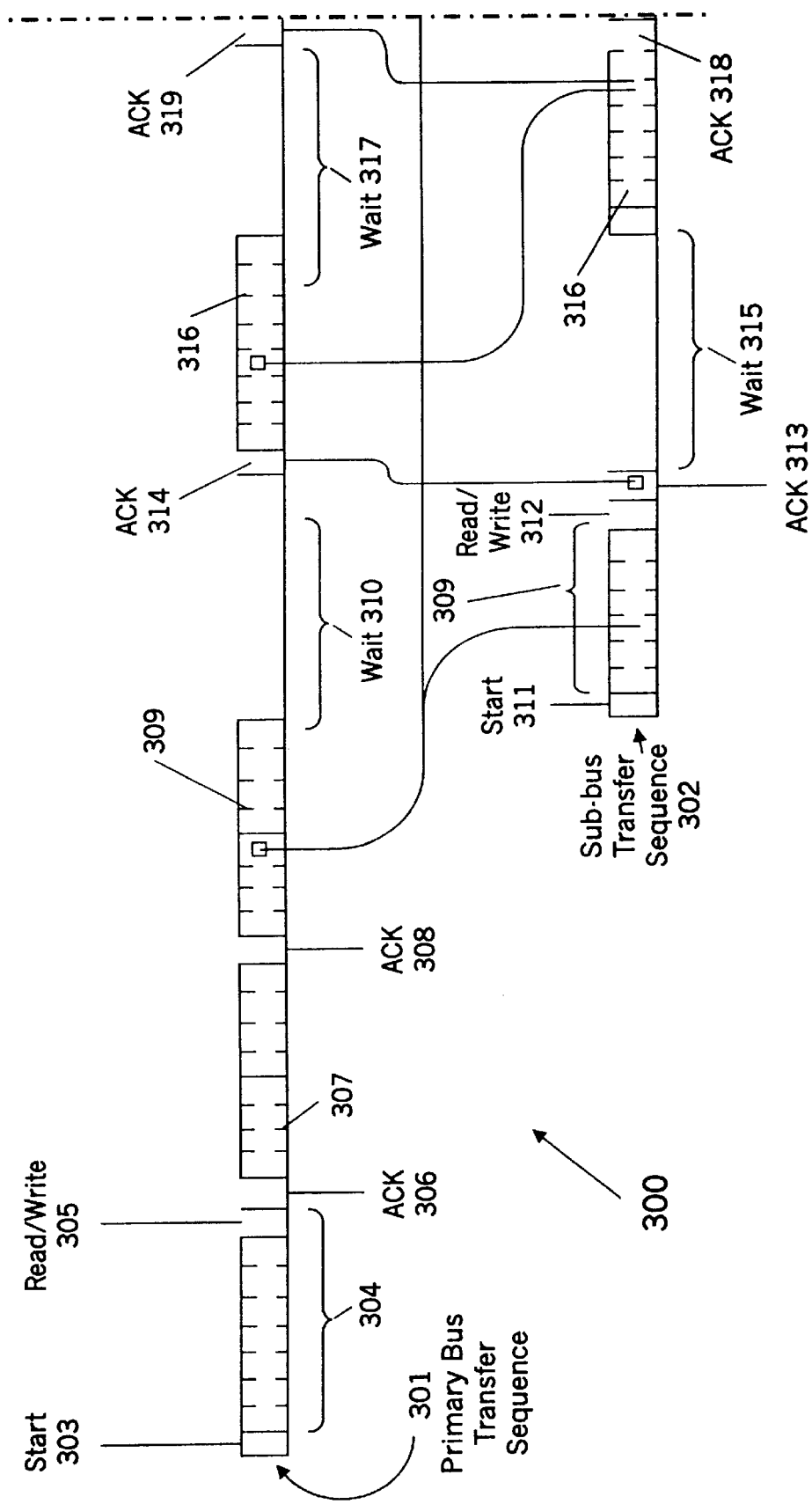
FIG. 3 comprising FIG. 3A and FIG. 3B schematically illustrates an I²C bus expansion transfer sequence in accordance with an embodiment of the present invention.

The operation of I²C expansion apparatus 200 may be further understood by referring now to FIG. 3 in which is illustrated a transaction between a bus master on a primary bus and an expansion device on a sub-bus, sub-bus transaction sequence 300, according to the principles of the present invention. Transaction sequence 300 includes primary bus transfer sequence 301 and sub-bus transfer sequence 302.

Sub-bus transaction sequence 300 begins with primary bus transfer sequence 301 initiating a data transfer with start condition 303. When I²C bus is at rest, both SDA 204 and SCL 206 must be "high". Start condition 303 corresponds to a "high" to "low" transition on primary SDA 204 while primary SCL 205 is "high" and is a standard control signal in the I²C protocol. Start 303 is followed by byte 304 constituting seven bits containing the address of expansion processor 202, FIG. 2, on primary bus 203. The last bit of byte 304 is read/write bit 305. Read/write bit 305 may signal a write with a "low" or logic "0" value in accordance with the I²C protocol. Expansion processor 202 responds with ACK 306. Primary bus transfer sequence 301 then continues with the next data bit 307 containing the code for the sub-bus on which the target expansion device resides. Following receipt of byte 307, expansion processor 202 responds with ACK 308. Data byte 309 is then transmitted. Data byte 309 contains the address of the target device on the sub-bus selected in byte 307. Primary bus transfer sequence 301 then enters wait state 310 generated by expansion processor 202 holding primary SCL 206 in a logic "0", or "low", value.

Sub-bus transfer sequence 302 then begins with expansion processor 202 asserting a start bit 311 and then asserting byte 309 on the sub-bus selected in byte 307. Address byte 309 includes read/write bit 312, which signals a write. The target expansion device acknowledges its address with ACK 313. This is echoed by expansion processor 202 to primary bus 203, ACK 314. Sub-bus transfer sequence 302 then enters wait state 315, generated by expansion processor 202 holding the clock and data lines of the sub-bus selected in byte 307.

During wait state 315 of sub-bus transfer sequence 302, primary bus transfer sequence 301 continues with the transmission of data byte 316. Primary bus transfer sequence 301 then enters wait state 317, and expansion processor 202 echoes data byte 316 in sub-bus transfer sequence 302. The target expansion device responds by acknowledging the receipt of data byte 316 with ACK 318 which is then echoed on primary bus 203, ACK 319. Sub-bus transfer sequence 302 then enters wait state 320.

Primary bus transfer sequence 301 then continues with a read operation by issuing start 325 and addressing expansion processor 202, byte 321 which includes read/write bit 322 signaling a read, which may be a "high", or logic "1", value according to the I²C protocol. Primary bus transfer sequence then enters wait state 323. A read operation uses the current target expansion device, wherein a read operation is always preceded by a write to establish the target device. Recall that expansion processor 202 stores the code corresponding to the current expansion bus and the current target device.

Sub-bus transfer sequence 302 continues with expansion processor 202 initiating the read transaction on the sub-bus corresponding to byte 307 with start condition 324 followed by address byte 325. The upper seven bits of address byte 325 correspond to the upper seven bits of address byte 309. The LSB of address byte 325 is read/write bit 326, signaling a read. The target device responds with ACK 327 which is echoed on primary bus 203, ACK 328, by expansion processor 202.

Following ACK 327, the target device sends the first byte of read data byte 329. Expansion processor 202 echoes this in primary bus transfer sequence 301. Following the echo of data byte 329, sub-bus transfer sequence 302 enters wait state 330. The bus master requesting the read from the expansion device acknowledges the first data byte, ACK 331. Primary bus transfer sequence 301 then enters wait state 332. ACK 331 is echoed by expansion processor 202 onto the expansion bus ACK 333. This informs the target expansion device to send the next data byte 334, which in transaction sequence 300 is a last read data byte. Data byte 334 is echoed in primary bus transfer sequence 301 by expansion processor 202. Because byte 334 is the last data byte to be read, the bus master initiating the read responds with NACK 335, which is echoed on the sub-bus selected by byte 307 by NACK 336. Then, sub-bus transaction sequence 300 ends with stop condition 337 in primary bus transfer sequence 301 which is echoed in sub-bus transaction sequence 302, stop 338. The NACK/STOP sequence is a standard sequence following a last data byte for read transactions within the I$^2$C protocol. Stop conditions 337 and 338 are signaled by a low to high transition in the corresponding serial data line while the associated serial clock line is held "high", or in a logic "1" state.

Figures 4, 4A:
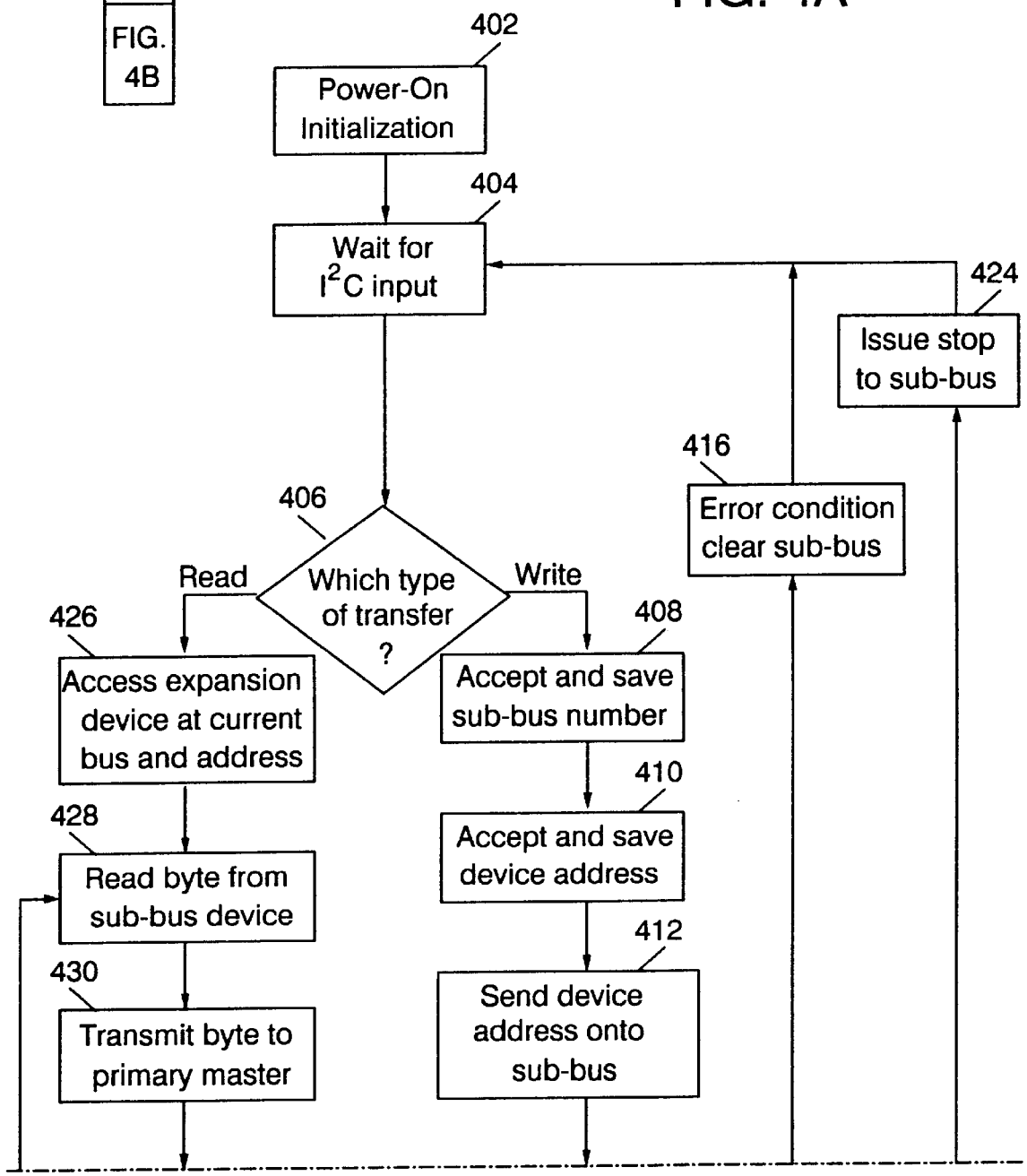
FIG. 4 comprising FIG. 4A
Figure 4B:
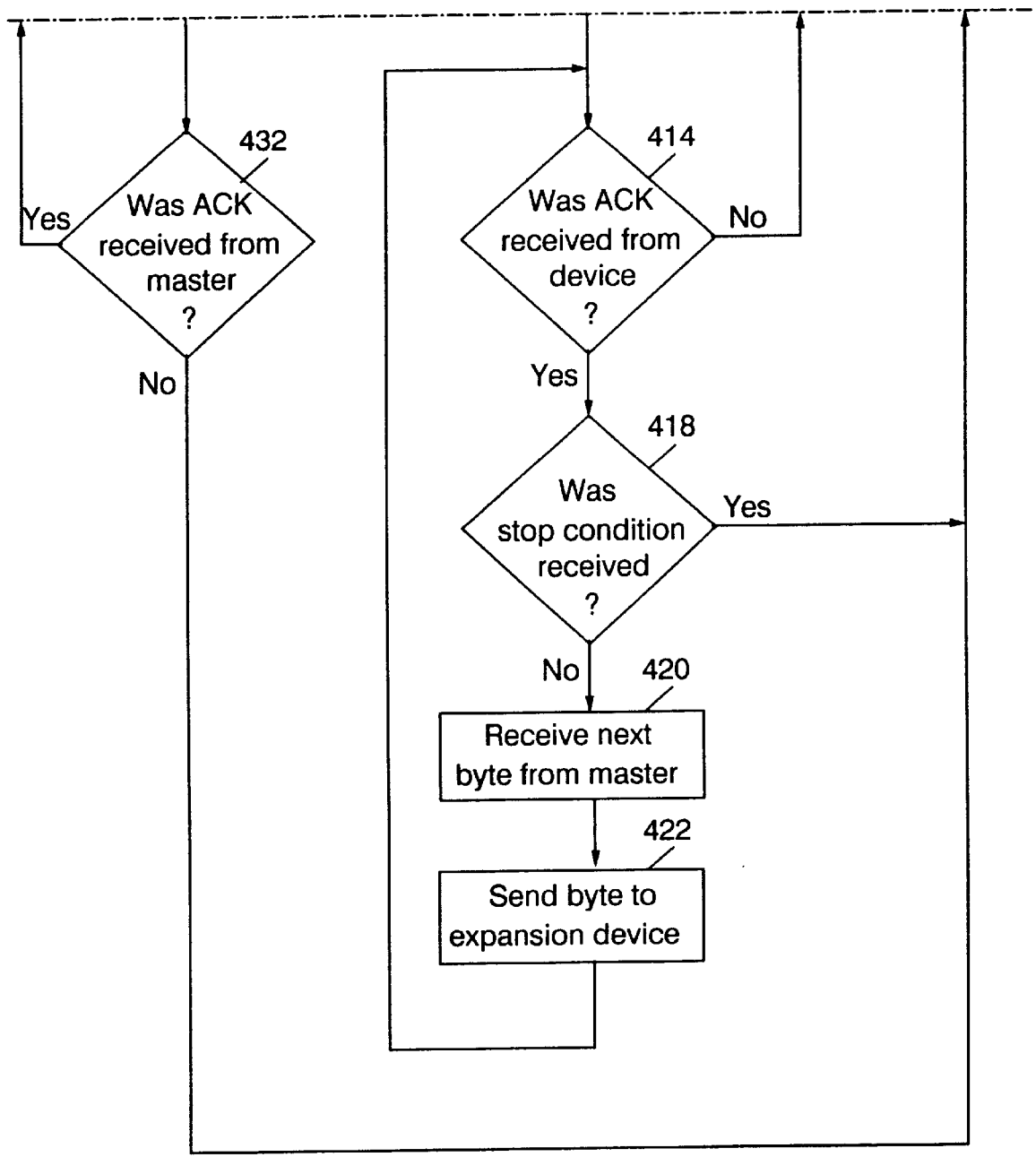
FIG. 4B illustrates, in flowchart form, an I²C bus expansion method in accordance with one embodiment of the present invention.

The operation of expansion processor 202 in a sub-bus transaction sequence, such as sub-bus transaction sequence 300, may be further understood by referring now to FIG. 4 illustrating a flowchart of I$^2$C bus expansion process 400 according to the present invention. Process 400 initializes on power-up in step 402, and in step 404 snoops primary bus 203 waiting for I$^2$C input addressed to expansion processor 202. On receipt of an address byte signaling the address of expansion processor 202, as previously described in conjunction with FIG. 3, process 400 determines if the bus master initiating the transaction is requesting a read or a write, step 406. For a write transaction, expansion processor 202 accepts and stores the sub-bus number on which the target expansion device resides, and in step 410 expansion processor 202 accepts and saves the address of the target device on the sub-bus designated by the sub-bus number from step 408. In step 412, expansion processor 202 sends the device address from step 410 onto the sub-bus from step 408.

In step 414, process 400 determines if an ACK was received from the target expansion device, acknowledging receipt of the address. If an ACK was not received, an error condition is signaled on primary bus 203 via a NACK, and the sub-bus designated in step 408 is cleared, step 416. Process 400 then returns to step 404.

If, in step 414, an ACK was received from the target expansion device, the write transaction can proceed. In step 418, process 400 determines if a stop condition is received from the requesting bus master on primary bus 203. If a stop condition was not received, in step 420 a next byte is received from the requesting bus master on primary bus 203, and in step 422 the byte is sent to the target expansion device by expansion processor 202. Process 400 then returns to step 414 to determine if the target expansion device received the byte successfully. Process 400 then continues to receive bytes from the bus master on primary bus 203 and echo them to the target expansion device by looping through steps 418, 420, 422 and 414, until a stop condition is received in step 418. When a stop condition is received, indicating that the write operation is concluded, in step 424, a stop is issued to the sub-bus designated by the sub-bus number received in step 408, and process 400 returns to snoop primary bus 203, in step 404.

If, in step 406, a read operation is signaled, process 400 continues in step 426 by accessing a current sub-bus and expansion device determined in steps 408 and 410, respectively. Thus, a read transaction is always preceded by a write transaction, namely, the device select/internal pointer sequence. In step 428, a byte is read from the target expansion device and, in step 430, transmitted to the primary bus master requesting the transaction.

In step 432, process 400 determines if receipt of the byte transmitted in step 430 is acknowledged. If an ACK is received in step 432, process 400 continues to read bytes by returning to step 428 and looping through steps 428, 430 and 432 until a NACK is received in step 432. Recall, as discussed in conjunction with FIG. 3, that for a read operation, the requesting master signals the last read byte with a NACK in the I$^2$C protocol. Process 400 then continues by issuing a stop to the current sub-bus, in step 424, and returns to step 404 to snoop primary bus 203.

Although the present invention and its advantages have been described in detail, it should be understood that various changes, substitutions and alterations can be made herein without departing from the spirit and scope of the invention as defined by the appended claims.

What is claimed is:

1. An apparatus for inter-IC (I$^2$C) bus expansion comprising:

an expansion processor operable for communicating on an I$^2$C bus, said expansion processor being coupled to a plurality of I$^2$C sub-buses, wherein each sub-bus of said plurality of I$^2$C sub-buses is operable for transferring data between said expansion processor and a plurality of I$^2$C compatible devices according to an I$^2$C protocol in response to signals on said I$^2$C bus, wherein each said sub-bus comprises a serial clock line (SCL) and a serial data line (SDA), wherein said expansion processor further includes a set of input terminals operable for receiving a data value corresponding to an I$^2$C address of said expansion processor on said I$^2$C bus.

2. The apparatus of claim 1 wherein said expansion processor is operable for addressing in response to said data value.

3. The apparatus of claim 1 wherein said set of input terminals comprises a set of bidirectional input/output (I/O) terminals, and wherein a subset of said set of input terminals is operable for being coupled to one of said plurality of I$^2$C sub-buses when said I$^2$C address is one of a set of predetermined I$^2$C addresses.

4. A data processing system comprising:

a central processing unit (CPU) operable for communicating on an inter-IC (I$^2$C) bus, said CPU being operable as an I$^2$C bus master; and an expansion processor coupled to said I$^2$C bus, said expansion processor being coupled to a plurality of I$^2$C sub-buses, wherein each sub-bus of said plurality of I$^2$C sub-buses is operable for transferring data between said expansion processor and a plurality of I$^2$C compatible devices according to an I$^2$C protocol in response to signals on said I$^2$C bus, wherein each said sub-bus comprises a serial clock line (SCL) and a serial data line (SDA), wherein said expansion processor further includes a set of input terminals operable for receiving a data value corresponding to an I$^2$C address of said expansion processor on said I$^2$C bus.

5. The data processing system of claim 4 wherein said expansion processor is operable for addressing in response to said data value.

6. The data processing system of claim 4 wherein said set of input terminals comprises a set of bidirectional input/output (I/O) terminals, and wherein a subset of said set of input terminals is operable for being coupled to one of said plurality of I$^2$C sub-buses when said I$^2$C address is one of a set of predetermined I$^2$C addresses.

7. A method for inter-IC (I$^2$C) bus expansion comprising the steps of:

snooping a primary I²C bus for a preselected address;
on receiving said preselected address, selecting for a read operation and a write operation on a sub-bus in response to a preselected data value in a portion of said preselected address; and
in response to a write signal in said portion further comprises the steps of:
receiving and storing a first data value, said first data value designating a sub-bus, in response to said preselected address;
receiving and storing a second data value, said second data value representing an expansion device address, in response to said preselected address; and
sending said second data value on a sub-bus designated by said first data value.

8. The method of claim 7 further comprising the steps of:
receiving a third data value; and
sending said third data value on said sub-bus.

9. The method of claim 8 further comprising the steps of:
receiving a fourth data value, said fourth data value being received on said sub-bus;
if said fourth data value signals an acknowledgment, repeating said steps of receiving and sending said third data value and said step of receiving said fourth data value; and
if said fourth data value signals a no acknowledgment, clearing said sub-bus and sending an error signal on said primary bus.

10. The method of claim 9 further comprising the steps of:
receiving a fifth data value, said fifth data value being received on said primary bus;
if said fifth data value signals a stop condition:
terminating said repeating step; and
issuing a stop signal on said sub-bus.

11. A method for inter-IC (I²C) bus expansion comprising the steps of:
snooping a primary I²C bus for a preselected address;
on receiving said preselected address, selecting for a read operation and a write operation on a sub-bus in response to a preselected data value in a portion of said preselected address; and
in response to a read signal in said portion further comprises the steps of:
accessing an expansion device at a current address on a current sub-bus;
reading a first data byte from said expansion device; and
sending said first data byte on said primary bus.

12. The method of claim 11 further comprising the steps of:
receiving a second data value, said second data value being received on said primary bus;
if said second data value signals an acknowledgment, repeating said steps of receiving and sending said first data value and said step of receiving said second data value; and
if said second data value signals a no acknowledgment, issuing a stop signal on said sub-bus.

13. A computer program product adaptable for storage on program storage media, the program product operable for inter-IC (I²C) bus expansion, said program product comprising:
snooping a primary I²C bus for a preselected address;
programming for, on receiving said preselected address, selecting for a read operation and a write operation on a sub-bus in response to a preselected data value in a portion of said preselected address; and
in response to a write signal in said portion the program product further comprises:
programming for receiving and storing a first data value, said first data value designating a sub-bus, in response to said preselected address;
programming for receiving and storing a second data value, said second data value representing an expansion device address, in response to said preselected address; and
programming for sending said second data value on a sub-bus designated by said first data value.

14. The computer program product of claim 13 further comprising:
programming for receiving a third data value; and
programming for sending said third data value on said sub-bus.

15. The computer program product of claim 14 further comprising:
programming for receiving a fourth data value, said fourth data value being received on said sub-bus;
programming for repeating said steps of receiving and sending said third data value and said step of receiving said fourth data value in response to said fourth data value signaling an acknowledgment; and
programming for clearing said sub-bus and sending an error signal on said primary bus in response to said fourth data value signaling a no acknowledgment.

16. The computer program product of claim 15 further comprising:
programming for receiving a fifth data value, said fifth data value being received on said primary bus; and
programming for terminating said repeating step and issuing a stop signal on said sub-bus, if said fifth data value signals a stop condition.

17. A computer program product adaptable for storage on program storage media, the program product operable for inter-IC (I²C) bus expansion, said program product comprising:
snooping a primary I²C bus for a preselected address;
programming for, on receiving said preselected address, selecting for a read operation and a write operation on a sub-bus in response to a preselected data value in a portion of said preselected address;
programming for accessing an expansion device at a current address on a current sub-bus, in response to a read signal in said portion;
programming for reading a first data byte from said expansion device; and
programming for sending said first data byte on said primary bus.

18. The computer program product of claim 17 further comprising:
programming for receiving a second data value, said second data value being received on said primary bus;
programming for repeating said steps of receiving and sending said first data value and said step of receiving said second data value, if said second data value signals an acknowledgment; and
programming for issuing a stop signal on said sub-bus, if said second data value signals a no acknowledgment.

* * * * *

UNITED STATES PATENT AND TRADEMARK OFFICE
CERTIFICATE OF CORRECTION

PATENT NO.      : 6,622,188 B1
DATED           : September 16, 2003
INVENTOR(S)     : Joel Gerard Goodwin et al.

It is certified that error appears in the above-identified patent and that said Letters Patent is hereby corrected as shown below:

<u>Title page, Item [54] and Column 1, Lines 1-2,</u>
Please replace the Title "12C BUS EXPANSION APPARATUS AND METHOD THEREFOR" to read -- I$^2$C BUS EXPANSION APPARATUS AND METHOD THEREFOR --.

Signed and Sealed this

Eighteenth Day of May, 2004

JON W. DUDAS
*Acting Director of the United States Patent and Trademark Office*